United States Patent Office.

CHARLES E. BONNET, OF PHILADELPHIA, PENNSYLVANIA, ASSIGNOR TO J. P. WILKINSON AND SONS, OF THE SAME PLACE.

Letters Patent No. 85,055, dated December 22, 1868.

IMPROVED COMPOSITION FOR ORNAMENTAL MOULDINGS.

The Schedule referred to in these Letters Patent and making part of the same.

*To all whom it may concern:*

Be it known that I, CHARLES E. BONNET, of Philadelphia, Pennsylvania, have invented an Improved Composition for Ornamental Mouldings; and I do hereby declare the following to be a full, clear, and exact description of the same.

My invention relates to a composition for the manufacture of ornamental mouldings for apartments, and for articles of furniture, such as picture-frames, &c., and consists in the combination of certain ingredients, substantially as described hereafter, forming a composition much more readily, effectively, and economically worked than those hitherto employed for the purpose.

To enable others skilled in the art to make my composition, I will now proceed to describe a method of compounding the same.

The method which I ordinarily employ of forming the composition, is as follows:

I take, of glue, two (2) pounds, dissolved in about five (5) pints of boiling water. To this, while still boiling, I add about one-fourth of a pound of paper-pulp, and then thoroughly agitate the mixture until it assumes the consistency of bakers' batter.

To the compound thus formed, I then add a mixture consisting of zinc-white or white lead and one gill of linseed or other oil.

After this, I stir in with the compound a quantity of whiting, sufficient to cause the mass to assume the consistency of tough dough, when it is ready for use.

This composition possesses several advantages over those hitherto in use for similar purposes, among which advantages may be enumerated the following:

First, it may be formed in wooden or other moulds, under heavy pressure, which is impossible with the French composition in most general use, and known to those skilled in the art as "*carton-pierre.*"

Second, when thus moulded, it is more compact and solid than other compositions, and presents a surface capable, without previous preparation, of receiving burnish-sizing for gilding. This is the great advantage of my composition over those heretofore employed as substitutes for the French composition above alluded to.

It will be understood that the proportions of ingredients which I have given above may be varied, without departing from my invention.

Without confining myself, therefore, to the precise proportion and combination of parts herein set forth,

I claim as my invention, and desire to secure by Letters Patent—

A composition, formed substantially as herein described, for the manufacture of ornamental mouldings.

In testimony whereof, I have signed my name to this specification, in the presence of two subscribing witnesses.

CHARLES E. BONNET.

Witnesses:
 JOHN WHITE,
 C. B. PRICE.